UNITED STATES PATENT OFFICE.

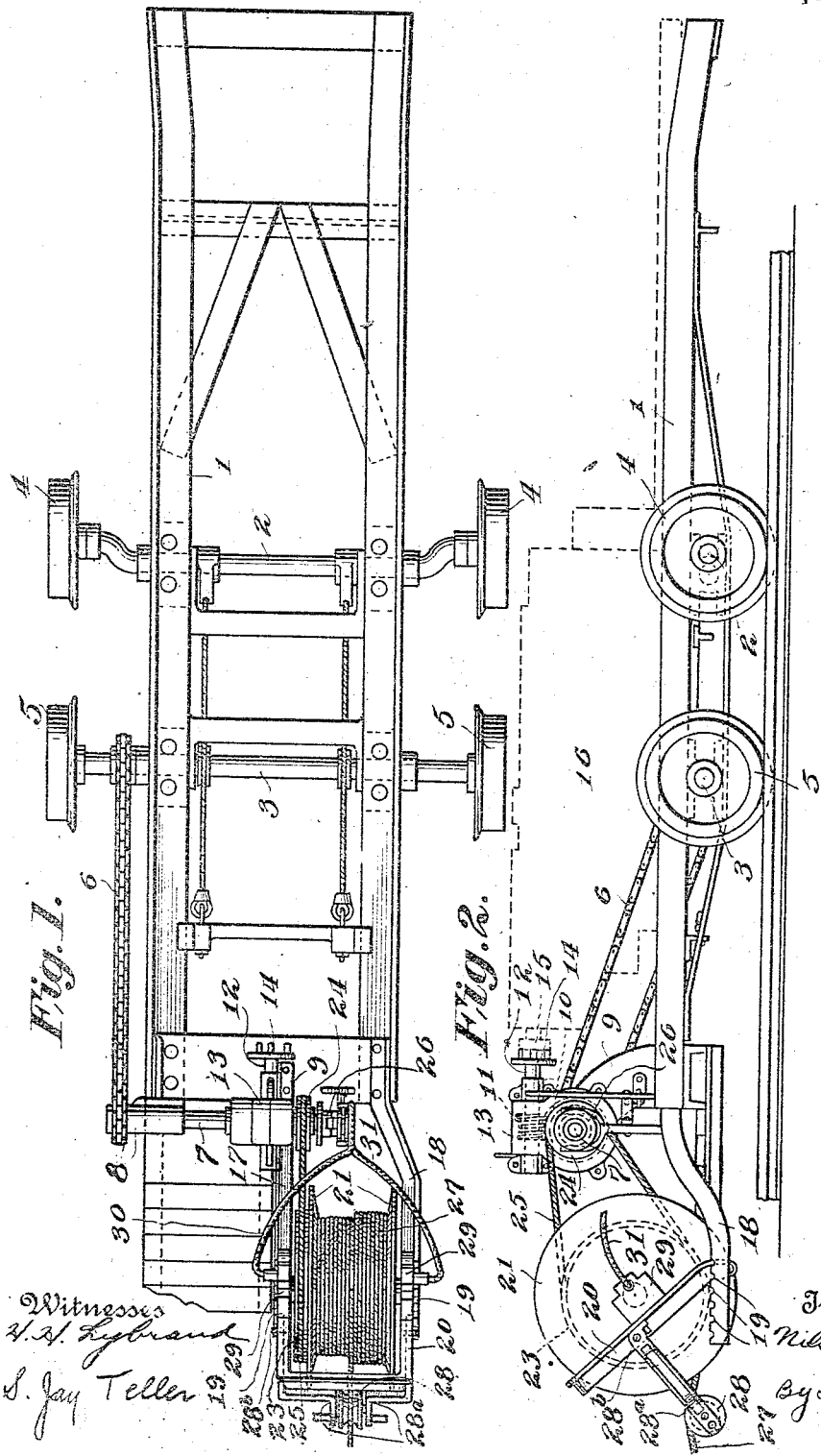

NILS DAVID LEVIN, OF COLUMBUS, OHIO, ASSIGNOR TO THE JEFFREY MANUFACTURING COMPANY, A CORPORATION OF OHIO.

CABLE-WINDING MECHANISM.

1,137,338.

Specification of Letters Patent.

Patented Apr. 27, 1915.

Original application filed August 31, 1910, Serial No. 579,793. Divided and this application filed December 5, 1911, Serial No. 664,037. Renewed August 17, 1914. Serial No. 857,263.

*To all whom it may concern:*

Be it known that I, NILS D. LEVIN, a citizen of the United States, residing at Columbus, in the county of Franklin and State of Ohio, have invented certain new and useful Improvements in Cable-Winding Mechanisms, of which the following is a specification, reference being had therein to the accompanying drawing.

This invention relates to winding mechanisms especially adapted and intended for controlling the winding and unwinding of electric conductor cables used for supplying current to a moving vehicle such as an electrically operable mining machine truck or an electric locomotive.

In the drawings, for the purposes of illustration, I have shown the reel applied to a mining machine truck, but it will be understood that is also well adapted for use in other connections.

One of the objects of the invention is to provide a reel which may be readily mounted upon or detached from its support.

Further objects of the invention are to provide improved friction means for controlling the reel to effect winding and to provide improved means for connecting and disconnecting the reel driving means with a source of power.

Further objects will appear from the following specification.

Of the drawings, Figure 1 is a plan view showing my improved winding mechanism applied to and connected with a mining machine truck. Fig. 2 is a side elevation, a mining machine being indicated in position on the truck.

As my present invention does not relate to the particular form of truck which is shown, it will be sufficient to refer to this very briefly. The truck comprises a main frame 1, mounted upon axles 2 and 3. Rotatably mounted upon the ends of the axle 2 are track wheels 4, 4. The axle 2 is cranked, its central portion being out of alinement with its end portions. Means are provided for rocking this shaft to effect the raising and lowering of the front end of the truck. Track wheels 5, 5, are rigidly connected with the axle 3. This axle 3 is rotatable and is connected by means of the chain 6 and suitable sprocket wheels with the transverse rotatable shaft 7 which is mounted in bearings 8 and 9 at the rear end of the truck. Adjacent the bearing 9 is a worm wheel 10 rigidly connected with the shaft 7. This worm wheel 10 meshes with a worm 11 on the longitudinal shaft 12 which is supported in suitable bearings on the casing 13 which incloses the worm and worm wheel.

At the forward end of the shaft 12 is a clutch element 14 which is adapted to mesh with a similar clutch element 15 at the rear end of a mining machine such as that indicated at 16. Power from the motor of the mining machine can be applied through the clutch elements 15 and 14 and through the gearing which has been described to cause the rotation of the shaft 7. From the shaft 7 power is transmitted through the chain 6 to the axle 3 to cause rotation of the track wheels and to propel the truck along the rails.

Two reel supporting bars 17 and 18 extend rearward from the rear end of the truck. Preferably these bars are angle irons arranged with the vertical flange extending upward at the outer side. The upward extending flanges of the two bars are similarly notched as indicated at 19. 20 indicates a reel supporting frame which is preferably in the form of an inverted U. The lower ends of this frame engage the notches 19 of the bars 17 and 18 and are thus held against movement.

21 indicates a cable reel which is mounted in suitable bearings on the frame 20 for rotation about a horizontal axis. At one side of the reel and secured to it is a grooved sheave 23. Rotatably mounted on the shaft 7 and in the same plane with the sheave 23 in a second grooved sheave 24. An endless rope belt 25 passes over these two sheaves and serves to operatively connect them. It will also be noted that the rope 25 serves to support the reel and the reel frame, the mounting of the frame at its lower end being a pivotal one. The sheave 24 on the shaft 7 may be operatively connected with the shaft by means of a manually controllable clutch 26.

27 represents an electric conductor cable connected to the reel in a manner to limit winding thereon. Preferably this cable has within it two separate conductor wires. An idler pulley 28 is provided for guiding the cable as it passes onto or from the reel. This pulley is mounted between the ends of two arms 28ª which are pivoted at their other ends to the frame 20 at 28ᵇ in such a way that they can be swung upward into positions parallel with the frame. In this way it is possible to swing the arms and the pulley out of the way when the reel is resting on the ground or is being carried from place to place.

Within suitable boxes 29, 29 on the frame 20 are mounted current collecting mechanisms. One of these boxes has within it the mechanism for gathering the positive current from the positive conductor of the cable and the other box is similarly provided with means for making connection with the negative conductor of the cable. Detachably connected conductor wires 30 and 31 lead from the boxes 29 to the terminals of a motor such as that on the mining machine.

The distance between the center of the power mechanism or driving devices on shaft 7 and the center of the reel is limited, and, therefore, the length of the endless rope transmitter 25 must be quite short. This prevents the use of the tighteners which such power transmitters ordinarily require for the purpose of giving them sufficient tension under all circumstances. But by the mounting of the reel in such way that it is movable relatively to the vehicle under the action of its gravity and in such direction as to bear against its driving rope, the tension on the latter is maintained sufficiently high to have the reel always effectively rotated, notwithstanding the fact that the rope transmitter cannot be provided with a tightener of the ordinary sort.

In operation let it be assumed that a mining machine is in operative position on the truck and that its clutch element 15 is in engagement with the clutch element 14 on the shaft 12. Power may then be transmitted from the motor of the mining machine through the connections, which have been described, to drive the truck in either direction. It being assumed that the ends of the conductors in the cable 27 are connected with suitable fixed supply conductors, current will be led to the mining machine motor through the cable and through the wires 30 and 31. When the truck is being driven toward the point at which the free end of the cable is attached the clutch 26 is thrown into engagement and the sheave 24 is caused to rotate with the shaft 7. Through the rod 25 power is transmitted to turn the reel in the direction to wind the cable. The diameters of the two sheaves 23 and 24 are so related that the tendency is for the rope to drive the reel at a speed greater than that which the motion of the truck along the track will permit. This tendency for relatively rapid rotation of the reel is counteracted by the cable tension which resists the rotation and causes the rope to slip on one of the sheaves. The result is that the reel is driven at exactly the proper speed and with the proper power to maintain the requisite tension in the cable.

The tension in the rope, and consequently its driving efficiency, may be varied by moving the lower end of the frame 20 from one set of notches to another set. In this way the point of support of the reel is brought nearer to and farther from the vertical plane of its center of gravity.

By removing the detachable wires 30 and 31 and by removing the rope 25 from the sheave 34 the whole reel, together with its supporting frame, may be readily separated from the truck. The fact that the reel is readily separated from the truck makes it especially adapted for use with an apparatus of this particular type for the reason that it is frequently found necessary, or desirable, to operate the mining machine at a point relatively remote from the truck. In such cases it frequently becomes necessary to move the reel from time to time to avoid the necessity of providing excessively long connectors 30 and 31.

This application constitutes a division of my copending application entitled Mining machine trucks, filed Aug. 31, 1910, Ser. No. 579,798.

I do not herein broadly claim a rope drive mechanism in combination with a cable reeling mechanism used upon, or suitable for, several propelling electric vehicles. Claims for this subject-matter are presented in my co-pending application Serial No. 859,095, filed August 28, 1914, as a division of my earlier application Serial No. 831,342, filed April 11, 1914, as a renewal of application Serial No. 507,635, filed July 14, 1909.

What I claim is:

1. In a cable winding mechanism for a vehicle, the combination of a reel frame supported at its lower end for movement about a horizontal axis, a reel rotatably mounted on the frame with its center of gravity at one side of the vertical plane through the said horizontal axis, a cable wound upon the reel, a rotatable rope sheave on the frame operatively connected with the reel, an endless rope belt passing over the sheave, a second rope sheave over which the rope also passes thereby serving to prevent movement of the reel and the reel frame about the horizontal axis of frame support, and means for driving the second sheave to cause rotation of the reel by means of the rope and the first sheave.

2. In a cable winding mechanism for a vehicle, the combination of a frame supported at its lower end in a manner to permit movement about a horizontal axis, a cable reel mounted on the frame for rotation about a horizontal axis the position of the reel on the frame being such that its center of gravity is at one side of the vertical plane through the horizontal axis of frame support, a cable wound upon the reel, a rope sheave rigidly connected to the reel for rotation therewith, a second relatively fixed rotatable sheave in the same vertical plane with the first sheave, an endless rope belt passing over the two sheaves and thereby serving to support the reel and its frame against movement about the axis of frame support, and means for driving the second sheave to cause rotation of the reel.

3. In a cable winding mechanism for a vehicle, the combination of a reel holding frame, a support upon which the frame is pivotally mounted in a manner to permit free removal therefrom, a rotatable cable reel on the frame positioned with its center of gravity at one side of the vertical plane through the pivotal axis of frame support, a rope sheave connected to the reel for rotation therewith, a second relatively fixed rotatable sheave in the same plane with the first sheave, an endless rope belt passing over the two sheaves and thereby serving to support the reel and its frame against movement about the axis of frame support, means for driving the second sheave to cause rotation of the reel, and a cable connected to the reel to be wound thereon.

4. In a cable winding mechanism for a vehicle, the combination of a frame supported at its lower end in a manner to permit movement about a transverse horizontal axis, a reel rotatably mounted on the frame with its center of gravity at one side of the vertical plane through the said horizontal axis, a cable wound upon the reel, a rotatable rope sheave operatively connected with the reel, a second fixed rope sheave in the same plane with the first rope sheave, an endless rope belt passing over the two sheaves and serving to support the reel and its frame against movement about the said horizontal axis, means for moving the lower end of the frame to change its axis of support and thereby vary the tension of the rope, and means for driving the second rope sheave to cause rotation of the reel.

5. In a cable winding mechanism for a vehicle, the combination of a reel supporting frame, a reel mounted on the frame for rotation about a horizontal axis, a cable wound upon the reel, means for supporting the frame at its lower end in a manner to permit swinging about a horizontal axis, means for horizontally adjusting the axis of frame support to vary the distance between the said axis and the vertical plane through the center of gravity of the reel, a rope sheave rigidly connected with the reel and rotatable therewith, a second rotatable rope sheave in the same vertical plane with the first rope sheave, an endless rope belt passing over the two sheaves and serving to support the reel and the frame against movement about the horizontal axis of the frame support, and means for rotating the second rope sheave to cause rotation of the reel.

6. In a cable winding mechanism for a vehicle, the combination of a reel holding frame, a support for the frame, means for pivotally holding the lower end of the frame in any one of a plurality of positions with respect to the support, a rotatable cable reel on the frame, a rope sheave on the frame operatively connected with the reel, a second relatively fixed rotatable rope sheave in the same plane with the first rope sheave, means for driving the second sheave, an endless rope belt passing over the two sheaves and serving to support the reel and the frame against movement about the axis of frame support, and a cable connected to the reel for winding thereon.

7. In a cable winding mechanism for a vehicle, the combination of a frame pivotally supported at its lower end for movement about a horizontal axis, a cable reel rotatably mounted on the frame with its center of gravity at one side of the vertical plane through the horizontal axis of frame support, a cable wound upon the reel, a rope sheave rotatably mounted on the frame and operatively connected with the reel, a relatively fixed rotatable power shaft, means for driving the power shaft, a second rope sheave rotatably mounted on the power shaft, a manually controllable clutch for connecting the second sheave with the power shaft, and an endless rope belt passing over the two sheaves, the rope serving to hold the reel and the frame against movement about the horizontal axis of frame support and also serving to transmit power to the second sheave to cause rotation of the reel.

8. In a cable winding mechanism for a vehicle, the combination of an inverted U-shaped frame, means for pivotally supporting the lower ends of the legs of the frame, a cable reel rotatably mounted between the legs of the frame with its center of gravity at one side of the vertical plane through the pivotal axis of frame support, a cable wound upon the reel, a rope sheave connected with the reel for rotation therewith, a second relatively fixed rotatable rope sheave, means for driving the second sheave, and an endless rope belt passing over the two sheaves, the rope serving to hold the reel and the frame against movement about the horizontal axis of frame support and also serving to transmit power to cause rotation of the first sheave and of the reel.

9. In a cable winding mechanism for a vehicle, the combination of an inverted U-shaped frame, means for adjustably supporting the lower ends of the legs of the frame in a manner to permit swinging about a horizontal axis, means for adjusting the lower ends of the legs to move the said horizontal axis, a cable reel rotatably mounted between the legs of the frame with its center of gravity at one side of the vertical plane through the axis of frame support, a cable wound upon the reel, a rope sheave connected with the reel and rotatable therewith, a relatively fixed rope sheave in the same plane with the first rope sheave, means for driving the second said rope sheave, and an endless rope belt passing over the two sheaves, the rope serving to hold the reel and the frame against movement about the horizontal axis of frame support, and also serving to transmit power to cause rotation of the reel, the tension in the rope being variable in accordance with the position of the axis of frame support.

10. In a cable winding mechanism for a vehicle, the combination of two rearward extending substantially horizontal bars connected with the vehicle, a reel supporting frame having two separated parallel legs, means for pivotally supporting the lower ends of the legs in engagement with the said bars in a manner to permit movement about a transverse horizontal axis, a cable reel rotatably mounted between the two legs of the frame with its center of gravity at one side of the vertical plane through the axis of frame support, a cable wound upon the reel, a rope sheave connected with the reel for rotation therewith, a second relatively fixed rotatable rope sheave in the same plane with the first rope sheave, means for driving the second rope sheave, and an endless rope belt passing over the two sheaves and serving to support the reel and the frame against movement about the horizontal axis of frame support and also serving to transmit power to the first sheave to cause rotation of the reel.

11. In a cable winding mechanism for a vehicle, the combination of two substantially horizontal parallel bars extending rearward from the rear end of the vehicle, a reel supporting frame comprising two separate parallel legs, means for connecting the lower ends of the legs with the said bars at any one of a plurality of points in a manner to support the frame to permit the swinging about a transverse horizontal axis, a cable reel rotatably mounted between the legs of the frame, a cable wound upon the reel, a rotatable rope sheave operatively connected with the reel, a second relatively fixed rope sheave in the same plane with the first rope sheave, means for driving the second rope sheave, and an endless rope belt passing over the two sheaves and serving to support the reel and the frame against movement about the horizontal axis of frame support and also serving to transmit power to the first sheave to cause rotation of the reel, the tension of the rope being variable in accordance with the position of the transverse axis about which the reel supporting frame may be swung.

12. In a cable winding mechanism for a vehicle, the combination of two substantially horizontal and parallel bars extending rearward from the vehicle, each of the bars being angle-shaped in cross section and having its vertical flange extending upward and notched along the rear part of its upper edge, a reel supporting frame comprising two separated parallel legs the lower ends of which are adapted to enter and engage any one of the sets of notches in the said bars to be supported thereby, a rotatable cable reel mounted between the two legs of the frame with its center of gravity at one side of the vertical plane through the lower ends of the frame legs, a cable wound upon the reel, a rope sheave rotatably mounted on the frame and connected with the reel, a relatively fixed rotatable rope sheave in the same plane with the first rope sheave, means for driving the second sheave, and an endless rope belt passing over the two sheaves and serving to support the reel and the frame against movement about a transverse axis through the lower ends of the frame legs and also serving to transmit power to the first sheave to cause rotation of the reel.

13. In a cable winding mechanism for a vehicle, the combination of a frame supported at its lower end for movement about a transverse horizontal axis, a cable reel rotatably mounted on the frame for rotation about a horizontal axis, the position of the reel being such that its center of gravity is at one side of the vertical plane through the axis of frame support, a cable connected with the reel to be wound thereon, a cable guiding pulley adjacent the reel and supported from the frame to move therewith, a rope sheave rotatable on the frame and connected with the reel, a second rope sheave in the same vertical plane with the first rope sheave, means for driving the second sheave, and an endless rope belt passing over the two sheaves and serving to support the reel and the frame against movement about the horizontal axis of frame support and also serving to transmit power to the first sheave to cause the rotation of the reel.

14. In a cable reeling mechanism for a vehicle, the combination of a horizontal cable reel, a frame on which the reel is mounted, means for supporting the frame at its lower end in a manner to permit movement about a horizontal axis positioned at one side of the vertical plane through the center of gravity of the reel, a cable connected with the reel to be wound thereon, a cable guiding pulley, a pulley supporting frame pivotally connected with the reel supporting frame, a rope sheave rotatably mounted on the reel supporting frame and operatively connected with the reel, a second relatively fixed rope sheave in the same plane with the first rope sheave, means for driving the second sheave, and an endless rope belt passing over the two sheaves and serving to support the reel and its frame against movement about the horizontal axis of frame support and also serving to transmit power to the first sheave to cause rotation of the reel.

15. In a cable winding mechanism for a vehicle, the combination of a reel support, a reel mounted thereon to be bodily movable relatively thereto under the action of its gravity, the electric cable winding at one of its ends on said reel and adapted to be at its other end fixed stationarily relative to the reel support, the power mechanism bodily fixed relatively to the reel support, and the relatively short endless power transmitter engaging with the power mechanism and with the reel, the latter being arranged to have its aforesaid movement increase the tension of the endless power transmitter.

16. In a cable winding mechanism for a vehicle, the combination of the support adapted to carry a reel-actuating motor, the cable reel mounted thereon to be bodily movable under the action of its gravity, the electric cable winding at one end on said reel and adapted to be at the other end fixed stationarily relatively to the support and to supply current to the reel-actuating motor, the power mechanism bodily fixed relatively to the support, and the short endless power transmitter connecting the power mechanism with the reel, said parts being arranged substantially as described whereby the tension of the endless power transmitter is maintained by the weight of the reel.

17. In a cable winding mechanism for a vehicle, the combination of the support adapted to carry a reel-actuating motor, the cable reel mounted on said support and movable bodily relatively thereto, the electric cable adapted to have one end fixed stationarily relatively to the support and the other wound upon said reel and adapted to be electrically connected to the motor, the bodily stationary power mechanism on the support, and the relatively short endless power transmitter interposed between the power mechanism and the reel and arranged to partially support the reel and to apply its tension thereto in opposition to the tension exerted by the cable on the reel.

In testimony whereof I affix my signature, in presence of two witnesses.

NILS DAVID LEVIN.

Witnesses:
D. DAVIS,
DUDLEY T. FISHER.